United States Patent [19]

Strobl

[11] Patent Number: 4,975,612
[45] Date of Patent: Dec. 4, 1990

[54] COMMUTATOR WITH ARMATURE WINDING CONNECTIONS

[75] Inventor: Georg Strobl, Repulse Bay, Hong Kong

[73] Assignee: Johnson Electric S.A., La Chaux de Fonds, Switzerland

[21] Appl. No.: 375,539

[22] Filed: Jul. 3, 1989

[30] Foreign Application Priority Data

Jul. 6, 1988 [GB] United Kingdom ............... 8816052

[51] Int. Cl.⁵ .................... H02K 13/04; H01R 39/16
[52] U.S. Cl. ............................... 310/234; 310/233; 310/235; 310/236; 310/71
[58] Field of Search ............... 29/597; 310/71, 233, 310/234, 235, 236, 237, 264

[56] References Cited

U.S. PATENT DOCUMENTS

| | | | |
|---|---|---|---|
| 3,869,190 | 3/1975 | Bazille, Jr. | 339/98 |
| 4,584,498 | 4/1986 | Strobl | 310/236 |
| 4,656,380 | 4/1987 | Strobl | 310/236 |

FOREIGN PATENT DOCUMENTS

| | | | |
|---|---|---|---|
| 1519383 | 7/1978 | United Kingdom . | |
| 2128818 | 5/1984 | United Kingdom . | |
| 2202384 | 9/1988 | United Kingdom | 310/71 |

*Primary Examiner*—Steven L. Stephan
*Assistant Examiner*—C. LaBalle
*Attorney, Agent, or Firm*—Fleit, Jacobson, Cohn, Price, Holman & Stern

[57] ABSTRACT

An armature for a motor comprises a winding and a commutator. Each commutator segment has a brush contacting portion and an integral terminal portion connected to a connector portion of the winding. A commutator base includes housings which receive the terminal portions and which have slots for positioning the connector portions of the winding relative to each housing. Each terminal portion has a slot which straddles and grips the connector portion positioned relative to a respective housing. At least one and preferably all terminal portions have two slots arranged side-by-side so that the two side-by-side slots of one of the terminal portions can straddle and grip the lead end and tail end of the winding, respectively.

7 Claims, 2 Drawing Sheets

COMMUTATOR WITH ARMATURE WINDING CONNECTIONS

INTRODUCTION

This invention relates to an armature for an electric motor and to an electric motor equipped with such an armature.

BACKGROUND

British Patent No. 2128818B discloses an armature having a commutator in which the commutator segments are connected to the armature winding by mechanical connections. Each commutator segment has a terminal portion provided with a slot which straddles and grips an armature winding portion. The slot is narrower than the winding portion and has an open end for receiving the winding portion and two cutting edges for cutting insulation on the winding portion as the winding portion moves into the slot. The terminal portions are located in respective recesses provided in a rose-like terminal support formed integrally with an electrically insulated commutator segment support.

One of the terminal portions has to make contact with the lead end and the tail end of the winding. The slot in the terminal portion has, therefore, to establish and maintain contact with both ends of the winding and this creates practical difficulties particularly when the winding is of relatively thick gauge wire.

In particular the slots in the terminal portions need to be relatively long in order to receive and accommodate two thick gauge wires especially as it has been found necessary to provide a small recess immediately behind the cutting edges to house the first wire while the second wire is drawn past the cutting edges. This has the result that the axial extent of the terminal portions and the rose-like terminal support is quite large and for a given motor frame size the space available for the commutator is limited so that the axial extent of the brush contacting portions of the commutator segments has to be lessened as compared with a motor having a winding of relatively thin gauge wire.

SUMMARY OF THE INVENTION

According to the present invention, there is provided an armature for an electric motor comprising a winding, a commutator having a base and a plurality of commutator segments mounted on the base, each segment having a brush contacting portion and an integral terminal portion which is connected to a connector portion of the winding, the base including a plurality of housings which are respectively formed with housing recesses for said terminal portions and with means for positioning the connector portions of the winding relative to each housing recess, and each terminal portion having a slot which straddles and grips the connector portion positioned relative to the respective housing recess, wherein at least one of the terminal portions has two slots arranged side-by-side, the two slots straddling and gripping two connector portions of the winding, respectively.

Preferably, the housing for said at least one terminal portion has two pairs of aligned slots for positioning the connector portions of the winding relative to the housing recess, one pair of aligned slots positioning one of the two connector portions and the other pair of aligned slots positioning the other of the two connector portions.

Conveniently, each terminal portion has two side-by-side slots.

Advantageously, each terminal portion has two parallel arms, each arm of said at least one terminal portion having two side-by-side slots.

Preferably, the slots in the terminal portions each have two cutting edges for cutting insulation on the connector portion as the connector portion enters the slot.

DESCRIPTION OF THE PREFERRED EMBODIMENT

Figure 1:
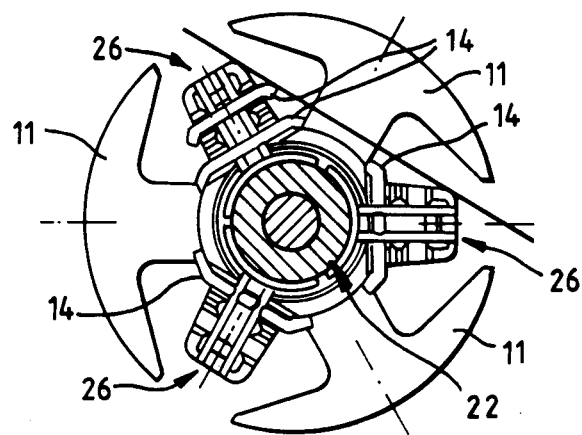
FIG. 1 is an end view of one embodiment of an armature according to the invention.
Figure 2:
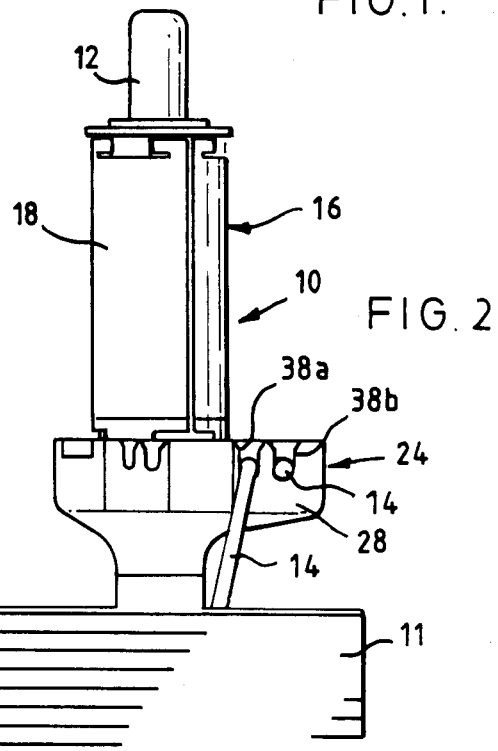
FIG. 2 is a side view of one end of the armature shown in FIG. 1.

Referring firstly to FIGS. 1 and 2, the armature shown therein comprises a barrel-type commutator 10 and a laminated armature core 11 mounted on an armature shaft 12, and winding portions 14. The commutator 10 comprises a base and three commutator segments 16 having brush contacting portions 18 and integral terminal portions 20. The base comprises a commutator segment support 22 on which the brush contacting portions 18 of the commutator segments 16 are seated, and a separate rose-like terminal support 24. The terminal support 24 has three housings 26 equally spaced around the axis of the shaft 12. Each of the housings 26 is used in effecting connection between a respective portion 14 of the armature winding and one of the commutator segments 16.

Each housing 26 has a recess defined by side walls 28, an end wall 30 and a cover 32. An opening 34 which faces the commutator segment support 22 is provided by the walls 28 and cover 32. The side walls 28 are parallel with the axis of the shaft 12.

A boss 36 projects centrally from the internal surface of the end wall 30 and extends within the housing 26 for approximately half the length of the side walls 28. The boss 36 extends parallel with the axis of the shaft 12 and is only connected to the terminal support 24 by the end wall 30. Each side wall 28 of the housing 26 has two radially spaced, side-by-side slots 38a and 38b which extend parallel to the axis of the shaft 12, from the commutator end of the housing 26 for a length which terminates at the level of the free end of the boss 36. One or two winding portions 14 of the armature winding (vide hereinafter) is/are placed in the slots 38 of the housings 26 and the winding portion(s) 14 rests on the end of the boss 36. The external ends of the side walls 28 are bevelled so as to facilitate entry of the winding portion 14 into the slots 38.

Figure 3:
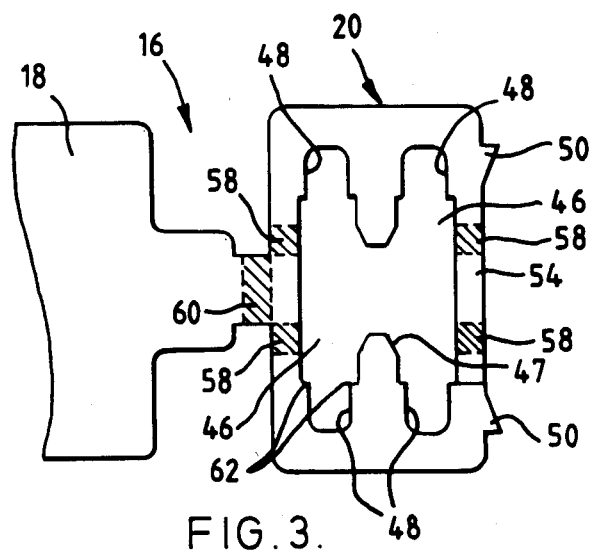
FIG. 3 is a plan view of part of one of the commutator segments of FIG. 1 in blank form, on an enlarged scale.
Figure 4:
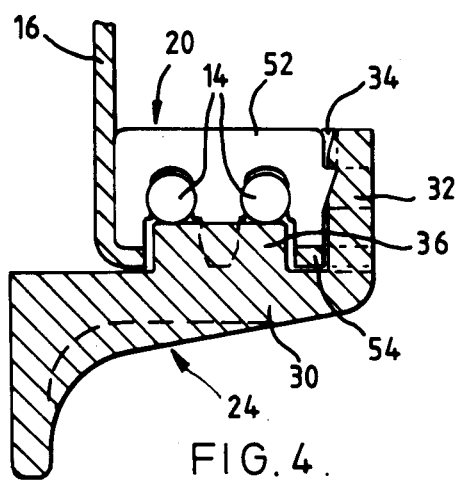
FIG. 4 is a sectional view showing a terminal portion of one of the commutator segments.

Referring now to FIG. 3 the terminal portion 20, which is connected to the rear end of the brush contacting portion 18, is rectangular with its minor axis coincident with the longitudinal axis of the commutator segment 16. The terminal portion 20 has two adjoining central cut out portions 46 which are each symmetrical with respect to the minor axis of the terminal portion 20.

Each cut out 46 reduces from its largest width at the centre of the terminal portion to two slots 48 which terminate at either end of each cut out 46. A triangular barb 50 is provided on either side of the minor axis of the terminal portion 20 along the edge furthest from the brush contacting portion 18.

Areas 58 of the terminal portion are shown in which bending occurs between a central portion 54 and an arm 52. Area 60 is also indicated in which bending occurs between the terminal portion 20 and the brush contacting portion 18.

Each slot 48 is narrower than the conducting core of winding portions 14 and the reduction in size from the centre of the cut out portion 46 to the start of the slot 48 provides a funnel 47 for guiding the arm 52 onto the winding portion 14. Two cutters 62 are provided between the funnel 47 and the slot 48.

Description will now be given of the assembly of an electric motor incorporating the present invention.

The terminal support 24 is placed on the armature shaft 12 against the end of the laminated core 11. The lead wire of the armature winding is mounted on the support 24 by laying the end of the wire 14 in the slots 38a provided in the side walls 28 of one housing 26. The wire 14 is drawn back into the housing 26 until it rests against the boss 36. From this start, the first armature coil is wound. After winding the first coil the armature is indexed and the wire 14 is layed in the same manner in the slots 38a of the next housing 26 without breaking the continuity of the wire 14.

This process is repeated until all three coils have been wound and the tail end of the winding is then layed in the slots 38b of the first housing 26 and pushed back against the boss 36. The wire 14 is then cut and the armature removed from the winding machine.

The body 10 now has a winding portion 14 comprising insulated wire laying in each of the housings 26. Each of the winding portions 14 is under tension and is pulled tight against the respective boss 36.

The commutator segments 16 are prepared ready for mounting on the support 22. The commutator segments 16 are provided in blank form as shown in FIG. 3. The brush contacting portion 18 of each commutator segment 16 is of part cylindrical form which conforms to the external radius of the commutator segment support 22. Terminal portion 20 is bent upwards from the commutator segment 16 and arms 52 of the terminal portion 20, which include the respective slots 48, are bent at 90° to central portion 54. The arms 52 therefore extend parallel to each other and to the longitudinal axis of the commutator segment 16, and forward along the commutator segment 16.

The commutator segments 16 are located on the support 22 in spaced angular relationship. The support 22 is then placed on the armature shaft 12 and moved towards the terminal support 24. As the terminal portions 20 enter the housings 26 the central portion 54 of each terminal portion 20 passes over a respective boss 36 and the slots 48 move over the wires 14. The cutters 62 sever the insulation on the wire 14 and further entry of the terminal portion 20 forces the wire 14 into the slots 4B. Intimate metal to metal contact is thereby provided between the wires 14 and the terminal portions 20.

The barbs 50 grip the covers 32 of the housings 26 and therefore retain the terminal portions 20 in the housings 26.

By laying the lead and tail ends of the winding in two radially spaced pairs of slots 38a and 38b in the housing 26 and by providing two side-by-side slots in the terminal portion 20 the radial extent of the terminal support 24 is increased but the axial extent is reduced as compared with a support in which the lead and tail ends of the winding are layed one on top of the other in a single pair of slots in the housing 26. This enables the axial length of the brush contacting portions 18 of the commutator segments 16 to be increased for a given motor frame size.

As described above, each side wall 28 of each housing 26 has two side-by-side slots 38a and 38b and each arm 52 of each terminal portion 20 has two side-by-side slots 48. This results in a symmetrical and balanced arrangement and keeps the number of different parts to a minimum thereby facilitating manufacture and assembly. However, it would be possible to provide only one of the housings 26 and one of the terminal portions 20 with side-by-side slots.

The above embodiment is given by way of example only and various modifications will be apparent to persons skilled in the art without departing from the scope of the invention defined by the appended claims. For example, the cutters could be omitted and the winding portions in the housings could be pre-stripped of insulation. Moreover, the commutator segment support 22 and the terminal support 24 could be integral with one another.

What is claimed is:

1. An armature for an electric motor comprising a winding, a commutator having a rotation axis, a base and a plurality of commutator segments mounted on the base, each segment having a brush contacting portion and an integral terminal portion which is connected to a connector portion of the winding, the base including a plurality of housings which are respectively formed with housing recesses for said terminal portions and with means for positioning the connector portions of the winding relative to each housing recess, and each terminal portion having a slot which straddles and grips the connector portion positioned relative to the respective housing recess, wherein at least one of the terminal portions has two slots arranged side-by-side, and spaced apart radially with respect to said axis, the two slots straddling and gripping respective connector portions of the winding.

2. An armature as claimed in claim 1, wherein the housing for said at least one terminal portion has two pairs of aligned radially spaced slots for positioning the respective connector portions of the winding relative to the housing recess, one pair of aligned slots positioning one of the two connector portions and the other pair of aligned slots positioning another of the two connector portions.

3. An armature as claimed in claim 1, wherein each terminal portion has two parallel arms, each arm of said at least one terminal portion having two side-by-side slots.

4. An armature as claimed in claim 1, wherein the slots in the terminal portions each have two cutting edges for cutting insulation on the connector portion as the connector portion enters the slot.

5. An armature as claimed in claim 1, wherein the base comprises two separate parts, one part supporting the brush contacting portions of the commutator segments and the other part including said housings.

6. An armature as claimed in claim 1, wherein each terminal portion is provided with a barb for retaining said terminal portion in said housing recess.

7. An electric motor having an armature comprising a winding, a commutator having a rotation axis, a base and a plurality of commutator segments mounted on the base, each segment having a brush contacting portion and an integral terminal portion which is connected to a connector portion of the winding, the base including a plurality of housings which are respectively formed with housing recesses for said terminal portions and with means for positioning the connector portions of the winding relative to each housing recess, and each terminal portion having a slot which straddles and grips the connector portion positioned relative to the respective housing recess, wherein at least one of the terminal portions has two slots spaced radially with respect to said axis and arranged side-by-side, the two slots straddling and gripping respective connector portions of the winding.

* * * * *